United States Patent
Kuwabara et al.

(10) Patent No.: US 8,371,754 B2
(45) Date of Patent: Feb. 12, 2013

(54) SPLIT-TYPE SLIDING BEARING FOR CRANKSHAFT IN INTERNAL COMBUSTION ENGINE AND SPLIT-TYPE SLIDING BEARING DEVICE

(75) Inventors: Aisuke Kuwabara, Inuyama (JP); Osamu Ishigo, Inuyama (JP); Yasushi Saito, Inuyama (JP)

(73) Assignee: Daido Metal Company Ltd., Naka-Ku, Nagoya (JP)

(*) Notice: Subject to any disclaimer, the term of this patent is extended or adjusted under 35 U.S.C. 154(b) by 561 days.

(21) Appl. No.: 12/647,160

(22) Filed: Dec. 24, 2009

(65) Prior Publication Data

US 2010/0166351 A1 Jul. 1, 2010

(30) Foreign Application Priority Data

Dec. 26, 2008 (KR) ................. 2008-333843

(51) Int. Cl.
*F16C 9/02* (2006.01)
*F16C 33/02* (2006.01)
*F16C 35/00* (2006.01)

(52) U.S. Cl. ......... 384/294; 384/278; 384/429; 384/434

(58) Field of Classification Search .......... 384/278, 384/294, 429, 430, 432–434; 123/195 R
See application file for complete search history.

(56) References Cited

U.S. PATENT DOCUMENTS

| | | | | |
|---|---|---|---|---|
| 3,603,174 A | * | 9/1971 | Patchen et al. | 384/429 |
| 4,307,921 A | * | 12/1981 | Roberts | 384/429 |
| 6,070,562 A | * | 6/2000 | Van Bezeij | 123/195 R |
| 6,422,755 B1 | * | 7/2002 | Cadle et al. | 384/433 |

FOREIGN PATENT DOCUMENTS

| | | |
|---|---|---|
| JP | 59051211 U | 4/1984 |
| JP | 3081549 A | 4/1991 |
| JP | 3223517 A | 10/1991 |
| JP | 5001713 A | 1/1993 |
| JP | 7119735 A | 5/1995 |
| JP | 3014314 U | 8/1995 |
| JP | 8021430 A | 1/1996 |
| JP | 08210355 | 8/1996 |
| JP | 10175131 | 6/1998 |
| JP | 2000199515 A | 7/2000 |
| JP | 2002188624 A | 7/2002 |
| JP | 2010508159 A | 3/2010 |
| WO | 2008052653 A1 | 5/2008 |

* cited by examiner

*Primary Examiner* — James Pilkington
(74) *Attorney, Agent, or Firm* — Browdy and Neimark, PLLC

(57) ABSTRACT

A split-type sliding bearing for a crankshaft in an internal combustion engine is incorporated in a split-type bearing housing. The sliding bearing is formed of a first and a second semi-cylindrical bearing bodies combined to form a cylindrical body. The bearing housing has a cylindrical bearing retaining bore and is formed of a pair of housing halves. One of the housing halves has a lower stiffness, and the other has a higher stiffness. The first bearing body is held by the housing half having a lower stiffness. The second bearing body is held by the stiffer housing half. The first and second bearing bodies have equal outer diameters, and both of the circumferential end parts of the first bearing body have a larger thickness than those of the second bearing body prior to incorporation into the housing halves.

13 Claims, 5 Drawing Sheets

US 8,371,754 B2

SPLIT-TYPE SLIDING BEARING FOR CRANKSHAFT IN INTERNAL COMBUSTION ENGINE AND SPLIT-TYPE SLIDING BEARING DEVICE

CROSS-REFERENCE TO RELATED APPLICATION

The present application claims priority from Japanese application JP2008-333843 filed on Dec. 26, 2008, the content of which is hereby incorporated by reference into this application.

FIELD OF THE INVENTION

The present invention relates to a split-type bearing for a crankshaft in an internal combustion engine, consisting of a pair of semi-cylindrical bearing bodies which are combined with each other to form a cylindrical body, and which are incorporated in a split-type bearing housing, having a cylindrical bearing retaining bore and consisting of a pair of housing halves each corresponding to the respective semi-cylindrical bearing body when the semi-cylindrical bearing bodies are incorporated in the cylindrical bearing retaining bore (see JP-A-08-210355, for example).

RELATED ART

As mentioned above, the split-type sliding bearing for a crankshaft in an internal combustion engine consists of the pair of semi-cylindrical bearing bodies which are incorporated in the pair of housing halves one of which is a part of an engine block, and the other one of which is a bearing cap. The bearing retaining bore of the split-type bearing housing is formed by a single machining process so as to have a true circle in a state that the pair of housing halves are combined with each other by means of fastening bolts before the pair of semi-cylindrical bearing bodies are incorporated in the bearing retaining bore.

Further, these years, in passenger vehicles, there has been generally used an engine block made of an aluminum alloy in order to reduce the weight of the vehicles. In such a case, the split-type bearing housing for a crankshaft is usually in combination of a pair of housing halves one of which is a part of the engine block made of an aluminum alloy and the other one of which is a bearing cap made of an iron alloy.

On the other hand, the respective semi-cylindrical bearing body of the split-type sliding bearing usually consists of a steel back and a bearing alloy layer. The split-type sliding bearing, consisting of the pair of semi-cylindrical bodies, has an outer peripheral surface having a circumferential length which is greater than the circumferential length of the inner surface of the split-type bearing housing. Because of such a dimensional relationship, when the pair of semi-cylindrical bearing bodies are incorporated into the split-type bearing housing, there arise a circumferential compression stress and radial stress in the semi-cylindrical bearing bodies. Accordingly, the pair of semi-cylindrical bearing bodies are fixed to and is caused to be in close contact with the inner surface of the split type bearing housing, while the split-type bearing housing is elastically deformed so as to expand radially, so that the inner diameter of the bearing housing increases.

There exists a bearing clearance between the inner surface of the split-type sliding bearing for a crankshaft, which a bearing clearance consists of a pair of semi-cylindrical bearing bodies, and the crankshaft, into which clearance lubricant oil is supplied. If the bearing clearance is excessively large, the crankshaft will have a play resulting in occurrence of vibration and noise in internal combustion engines.

On the other hand, since it is hard to avoid accidental dimensional errors in machining processes of the bearing retaining bore of the split-type bearing housing and the crankshaft with respect to an inner and an outer diameters thereof, respectively, there will occur a variance of the bearing clearance between the bearing housing and the crank shaft. Thus, in order to properly set the bearing clearance, it is necessary to restrain the variance of the bearing clearance by selecting a split-type sliding bearing having an appropriate thickness.

As mentioned above, when the split-type sliding bearing is incorporated in the bearing housing, the bearing housing is deformed so as to radially expand. In the case of occurrence of such expanding deformation, the bearing clearance increases by a degree corresponding to the expanding deformation in comparison with a designed bearing clearance which is determined by the inner diameter of the bearing retaining bore of the bearing housing, the outer diameter of the shaft and the thickness of the semi-cylindrical bearing bodies, thereby occurring a variance of the bearing clearance also due to the expanding deformation.

With regard to such a variance, JP-A-10-175131 teaches to reduce a variance of a clearance dimension between a split-type bearing housing and a crankshaft, the variance being caused by an expanding deformation of the bearing housing, by virtue of a selective combination of a circumferential length of an outer surface of the split-type sliding bearing and a diameter of a bearing retaining bore of the bearing housing.

Conventionally split-type bearing housings for crankshafts have been deteriorated in stiffness under a requirement for weight reduction of internal combustion engines. For the purpose of weight reduction, engine blocks made of an aluminum alloy have been commonly used.

Here, referring now to FIGS. 9 and 10, there will be provided a description of the relationship between the split-type bearing housing and the split-type sliding bearing consisting of a pair of semi-cylindrical bearing bodies and incorporated in the split-type bearing housing.

FIG. 9 shows a split-type bearing housing 01 which is comprised of a first housing half 02 which is a part of an engine block, and a second housing half 03 which is a bearing cap (made of, for example, an iron alloy). A bearing retaining bore (05, 06), having a cross-sectional form of a true circle, is formed at a room temperature by machining the housing halves 02 and 03 which have been combined in advance with each other by fastening bolts 04. Thereafter, in order to assemble the bearing device, after the bolts are removed from the split-type bearing housing 01, semi-cylindrical bearing bodies 07, 08 which constitute the split-type sliding bearing are mounted along the inner surface (05, 06) of the bearing retaining bore, and subsequently the housing half 03 is again combined with the housing half 02 by fastening the bolts 04 (see FIG. 10).

In order to fit and fix the split-type sliding bearing in the split-type bearing housing which has been commonly used in recent years while having a low stiffness, when the split-type bearing housing is fastened by the bolts 04 so as to provide the split-type sliding bearing with inner stress having a degree similar to that of the conventional bearing device, the expanding deformation of the inner diameter of the split-type bearing housing becomes larger. Further, since there is a difference in stiffness between the housing halves 02, 03 which constitute the split-type bearing housing, there will arise a difference in the expanding deformation between the inner diameters of the housing halves 05, 06 at their abutting end faces (in a divisional plane of the split-type bearing housing) due to the expanding deformation which arises when incorporating the split-type sliding bearing into the bearing housing, resulting in occurrence of differential steps (see the reference mark G shown in FIG. 10). Accordingly, differential steps (g) arise also in the inner surface of the bearing at the abutting end faces of the semi-cylindrical bearing bodies 07, 08.

On the other hand, in these years, since oil pumps have been downsized in internal combustion engines, the quantity of lubricant oil supplied onto the inner surface of the split-type sliding bearing is reduced, and accordingly, the bearing clearance between the inner surface of the sliding bearing and of the crankshaft has been set to be small in order to decrease a quantity of leakage of the lubricant oil from the bearing clearance. Thus, in the case where there exist the differential steps (g) in the inner surface of the split-type sliding bearing at the abutting end faces of the semi-cylindrical bearing bodies 07, 08, the area rate of the differential step, which acts as a barrier against the flow of the lubricant oil, to the sectional area of the passage for the lubricant oil becomes relatively higher thereby resulting in occurrence of an oil wiping phenomenon due to the differential step (g), and accordingly, the leakage quantity of the lubricant oil increases in comparison with a larger conventional bearing clearance, so that there has been likely to occur an insufficient supply of the lubricant oil onto the sliding surface of the bearing.

JP-A-10-175131 discloses measures adapted to decrease the bearing clearance between the inner peripheral surface of a sliding bearing and the outer surface of a shaft in order to greatly reduce the noise from an internal combustion engine. However, JP-A-10-175131 fails to consider any problem of occurrence of a differential step in the inner peripheral surface of the bearing between the abutting end faces of a pair of semi-cylindrical bearing bodies when the semi-cylindrical bearing bodies are incorporated in a pair of bearing halves of the split-type bearing housing which have degrees of stiffness that are different from each other.

BRIEF SUMMARY OF THE INVENTION

Thus, an object of the present invention is to solve the problem of the oil wiping phenomenon due to occurrence of the differential step in the inner surface of the sliding bearing at the abutting end faces of the pair of semi-cylindrical bearing bodies which constitute the sliding bearing when the semi-cylindrical bearing bodies are incorporated in a pair of housing halves which constitute a split-type bearing housing for a crankshaft in an internal combustion engine and which are different in stiffness from each other.

Under the above object, according to a first aspect of the present invention, there is provided a split-type bearing for a crankshaft in an internal combustion engine, consisting of a pair of semi-cylindrical bearing bodies which are combined with each other to form a cylindrical body, and which are incorporated in a split-type bearing housing, having a cylindrical bearing retaining bore and consisting of a pair of housing halves each corresponding to the respective semi-cylindrical bearing body when the semi-cylindrical bearing bodies are incorporated in the cylindrical bearing retaining bore, wherein the split-type bearing housing consists of one housing half having a relatively lower stiffness, and another housing half having a relatively higher stiffness, wherein the former housing half supports one of the pair of semi-cylindrical bearing bodies, which is of a first semi-cylindrical bearing body, and the latter housing half supports the remainder of the pair of semi-cylindrical bearing bodies, which is of a second semi-cylindrical bearing body, and wherein the first and second semi-cylindrical bearing bodies have the following dimensional relationship before they are incorporated in the bearing housing consisting of the pair of the housing halves:

(1) the first and second semi-cylindrical bearing bodies have an equal outer diameter, and (2) both of the circumferential end parts of the first semi-cylindrical bearing body have a larger thickness than those of the second semi-cylindrical bearing body, whereby the inner surfaces of the first and second semi-cylindrical bodies are in alignment with each other at those abutting circumferential end faces when the pair of housing halves are combined with each other by fastening bolts after the first and second semi-cylindrical bearing bodies are incorporated therein, even though differential steps arise between abutting end faces of the housing halves by a deformation difference between both of the housing halves due to a difference in stiffness.

Here there will be provided a description about the above aligned condition of the inner surfaces of the first and second semi-cylindrical bodies.

The above alignment dose not mean that both of the inner surfaces of the semi-cylindrical bearing bodies are in geometrically full alignment with each other. When the pair of housing halves are combined with each other by fastening bolts after the first and second semi-cylindrical bearing halves are incorporated therein, there will arise an expanding deformation difference between both of the housing halves, in the diameter of the bearing retaining bore, at the abutting end faces of the housing halves. The expanding deformation difference may be obtained by, for example, the following equations for calculating a value of the expanding deformation difference. A half of the thus obtained value is set as a difference in thickness between the respective abutting end faces of the semi-cylindrical bearing bodies while tolerating errors determined by machining accuracy during producing of the split-type sliding bearing and the split-type bearing housing.

$$\Delta D = \Delta D(L) - \Delta D(H) \qquad \text{Equation 1}$$

where $\Delta D$ (mm) is a value of expanding deformation difference, $\Delta D(L)$ (mm) is a value of expanding deformation in the inner diameter of the bearing retaining bore of the housing half having a relatively lower stiffness, and $\Delta D(H)$ (mm) is a value of expanding deformation in the inner diameter of the bearing retaining bore of the other housing half having a relatively higher stiffness.

$$\Delta D(L) = \frac{B_H(L)}{B_B + B_H(L)} \times \sigma \qquad \text{Equation 2}$$

where $B_B$ is a coefficient concerning the stiffness of the cylindrically combined semi-cylindrical bearing bodies (mm$^2$/N), $B_H(L)$ is a coefficient concerning the stiffness of the housing half having a relatively lower stiffness in the cylindrically combined housing halves, and $\sigma$ is a fitting interference between an outer diameter of the semi-cylindrical bearing bodies and an inner diameter of the bearing retaining bore (mm).

$$B_B = \frac{(1 - v_B) + (1 + v_B)(1 - 2t/D)^2}{E_B \cdot 4t/D(1 - t/D)} \qquad \text{Equation 3}$$

where t is a thickness of the semi-cylindrical bearing bodies (mm), D is a diameter of the bearing retaining bore (mm), $E_B$ is a Young's modulus (GPa) of the semi-cylindrical bearing bodies, and $v_B$ is a Poisson ratio of the semi-cylindrical bearing bodies.

$$B_H(L) = \frac{(1 - v_H(L)) + (1 + v_H(L))(D_H(L)/D)^2}{E_H(L) \cdot \{(D_H(L)/D)^2 - 1\}} \quad \text{Equation 4}$$

where $v_H(L)$ is a Poisson ratio of the bearing housing having a relatively lower stiffness, $D_H(L)$ (mm) is an outer diameter of the bearing housing having a relatively lower stiffness, and $E_H(L)$ is a Young's modulus (GPa) of the bearing housing having a relatively lower stiffness.

$$\Delta D(H) = \frac{B_H(H)}{B_B + B_H(H)} \times \sigma \quad \text{Equation 5}$$

where $B_H(H)$ is a coefficient concerning the stiffness of the housing half having a relatively higher stiffness in the cylindrically combined housing halves.

$$B_H(H) = \frac{(1 - v_H(H)) + (1 + v_H(H))(D_H(H)/D)^2}{E_H(H) \cdot \{(D_H(H)/D)^2 - 1\}} \quad \text{Equation 6}$$

where $v_H(H)$ is a Poisson ratio of the split-type bearing housing having a relatively higher stiffness, $D_H(H)$ (mm) is an outer diameter of the bearing housing having a relatively higher stiffness, and $E_H(H)$ is a Young's modulus (GPa) of the bearing housing having a relatively high stiffness.

According to a first embodiment of the sliding bearing of the present invention, the first semi-cylindrical bearing body has a uniform thickness throughout the entire circumferential length thereof.

According to a second embodiment of the sliding bearing of the present invention, the first semi-cylindrical bearing body has a thickness increasing from a circumferential midsection toward the abutting circumferential end faces of the first cylindrical bearing body.

According to a third embodiment of the sliding bearing of the present invention, the second semi-cylindrical bearing body has a uniform thickness throughout the entire circumferential length thereof.

According to a fourth embodiment of the sliding bearing of the present invention, the second cylindrical bearing body has a thickness decreasing from a circumferential midsection toward the abutting circumferential end faces of the second cylindrical bearing body.

According to a fifth embodiment of the sliding bearing of the present invention, at least the second semi-cylindrical bearing body is provided with a number of circumferential grooves formed on the inner surface of the second semi-cylindrical bearing body, and the circumferential grooves have a depth of from not less than 5 μm to not more than 20 μm in circumferential end regions including both circumferential ends.

According to a sixth embodiment of the sliding bearing of the present invention, the first semi-cylindrical bearing body is provided with a number of circumferential grooves formed on the inner surface of the first semi-cylindrical bearing body, and the circumferential grooves have a depth of from not less than 5 μm to not more than 20 μm in circumferential end regions including both circumferential ends.

According to a seventh embodiment of the sliding bearing of the present invention, each of the circumferential end regions in the inner surface of the first semi-cylindrical bearing body has a range defined by a circumferential length corresponding to a circumferential angle of at least 10° but up to 50°, which is measured from the respective circumferential end of the first semi-cylindrical bearing body as a starting point.

According to an eighth embodiment of the sliding bearing of the present invention, the inner surface of the first semi-cylindrical bearing body has a surface roughness of not more than 3.2 μm Rz except for the regions each defined by the circumferential length corresponding to the circumferential angle.

According to a ninth embodiment of the sliding bearing of the present invention, the circumferential grooves in the first semi-cylindrical bearing body have a pitch of 0.3 mm to 1.5 mm.

According to a tenth embodiment of the sliding bearing of the present invention, a depth of the circumferential grooves formed in the inner surface of the second semi-cylindrical bearing body is not less than a size of differential steps occurred between the circumferential abutting end faces of the first and second semi-cylindrical bearing bodies.

According to a second aspect of the present invention, there is provided a split-type sliding bearing device for a crankshaft in an internal combustion engine, comprising:

a split-type sliding bearing for a crankshaft in an internal combustion engine, consisting of a pair of semi-cylindrical bearing bodies which are combined with each other to form a cylindrical body, and a split-type bearing housing, having a cylindrical bearing retaining bore and consisting of a pair of housing halves each corresponding to the respective semi-cylindrical bearing body when the semi-cylindrical bearing bodies are incorporated in the cylindrical bearing retaining bore, wherein the split-type bearing housing consists of one housing half having a relatively lower stiffness, and another housing half having a relatively higher stiffness, wherein the former housing half supports one of the pair of semi-cylindrical bearing bodies, which is of a first semi-cylindrical bearing body, and the latter housing half supports the remainder of the pair of semi-cylindrical bearing bodies, which is of a second semi-cylindrical bearing body, and wherein the first and second semi-cylindrical bearing bodies have the following dimensional relationship before they are incorporated in the bearing housing consisting of the pair of the housing halves:

(1) the first and second semi-cylindrical bearing bodies have an equal outer diameter, and (2) both of the circumferential end parts of the first semi-cylindrical bearing body have a larger thickness than those of the second semi-cylindrical bearing body, whereby the inner surfaces of the first and second semi-cylindrical bodies are in alignment with each other at those abutting circumferential end faces when the pair of housing halves are combined with each other by fastening bolts after the first and second semi-cylindrical bearing bodies are incorporated therein, even though differential steps arise between abutting end faces of the housing halves by a deformation difference between both of the housing halves due to a difference in stiffness.

In the conventional split-type bearing for a crankshaft in an internal combustion engine, which is incorporated in the split-type bearing housing consisting of the pair of housing halves being different in stiffness from each other, when the pair of housing halves are combined with each other by fastening bolts after the split-type sliding bearing is incorporated in the housing halves, there will arise a difference in expanding deformation, between the housing half having relatively lower stiffness and the other housing half having relatively higher stiffness, and in the diameter of the bearing retaining bore at the circumferential abutting end faces (corresponding to a dividing split plane of the split-type bearing housing) of the housing halves, by stress generating when combining the housing halves with each other, whereby arising a differential step (see reference mark G in FIG. 10). However, in the case of the invention split-type bearing incorporated in the split-type bearing housing, essentially such a differential step dose not occur at the circumferential abutting end faces of the pair of semi-cylindrical bodies which is held in the bearing retaining bore of the split-type bearing housing. This is because the thickness of the circumferential end parts of the semi-cylindrical bearing body, held by the housing half having a relatively lower stiffness and being liable to undergo a large expanding deformation, is greater than that of the semi-cylindrical bearing body held by the housing halve having a relatively higher stiffness and undergoing a small expanding deformation. Thus, by appropriately selecting the difference in thickness between the semi-cylindrical bearing bodies, a differential step being liable to occur between the circumferential abutting ends of the pair of housing halves can be substantially offset.

Referring to the accompanying drawings, hereinbelow there will be provided a description of some embodiments of the present invention.

DETAILED DESCRIPTION OF THE INVENTION

Embodiment 1

Figure 1:
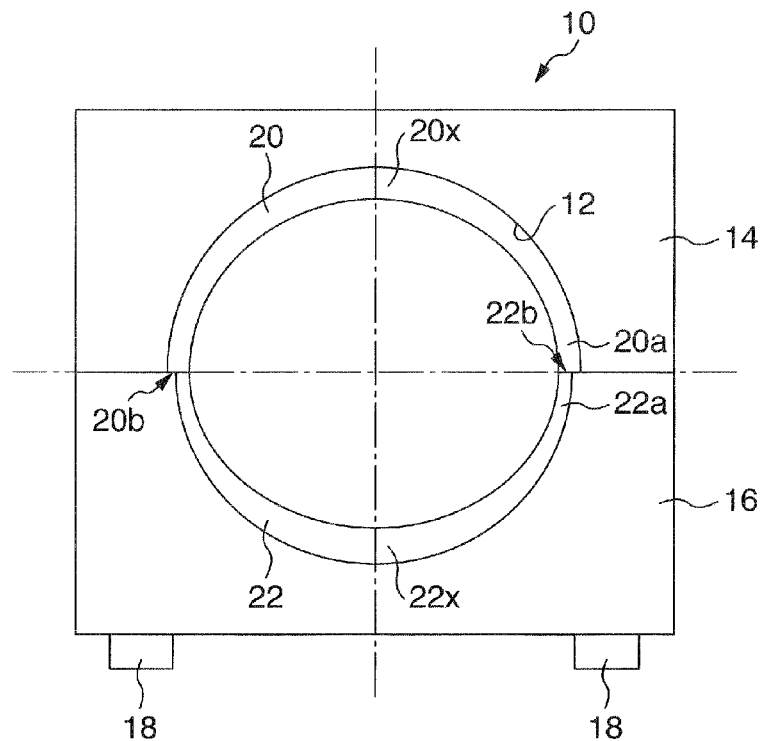
FIG. 1 is a front view illustrating a split-type sliding bearing for a crankshaft in an internal combustion engine, in Embodiment 1 of the present invention, in the condition that the split-type sliding bearing is incorporated in a split-type bearing housing comprised of a pair of housing halves having degrees of stiffness which are different from each other.

Referring to FIG. 1 which is a front view illustrating a split-type sliding bearing for a crankshaft in an internal combustion engine, which is comprised of a pair of semi-cylindrical bearing bodies 20, 22 and which is incorporated in a bearing retaining bore 12 in a split-type bearing housing 10, the split-type bearing housing 10 is comprised of a housing half 14 having a low stiffness, which is a part of an engine block made of an aluminum alloy, and a housing half 16 having a high stiffness, which is a bearing cap made of an iron alloy, and both housing halves 14, 16 are integrally combined with each other by fastening bolts 18. The bearing retaining bore 12 in the bearing housing 10 is a cylindrical bore having a cross-sectional form of a true circle, which is formed by machining the housing halves 14, 16 which have been previously combined with each other by fastening the bolts 18 with no split-type bearing being held therebetween. FIG. 1 shows the condition that the housing halves 14, 16 are combined with each other by fastening the bolts 14 so as to be integrally incorporated with each other in the manner that the split-type bearing housing 10 is disassemble after the bearing retaining bore 12 is formed by machining as stated above, and then the semi-cylindrical bearing bodies 20, 22 are mounted along the inner surfaces of the housing halves 14, 16.

Although the semi-cylindrical bearing bodies 20, 22 initially have an equal outer diameter before they are incorporated in the split-type bearing housing 10, their wall thicknesses are different from each other at their abutting end parts 20a, 22a. That is, the relationship between the wall-thicknesses is such that the wall thickness of the abutting end part 20a is larger than that of the abutting end part 22a. Further, the wall thicknesses of the semi-cylindrical bearing bodies 20, 22 are maximum in the circumferentially midsections 20x, 22x of the semi-cylindrical bearing bodies and become smaller and smaller toward their abutting end faces 20b, 22b.

Figure 10:
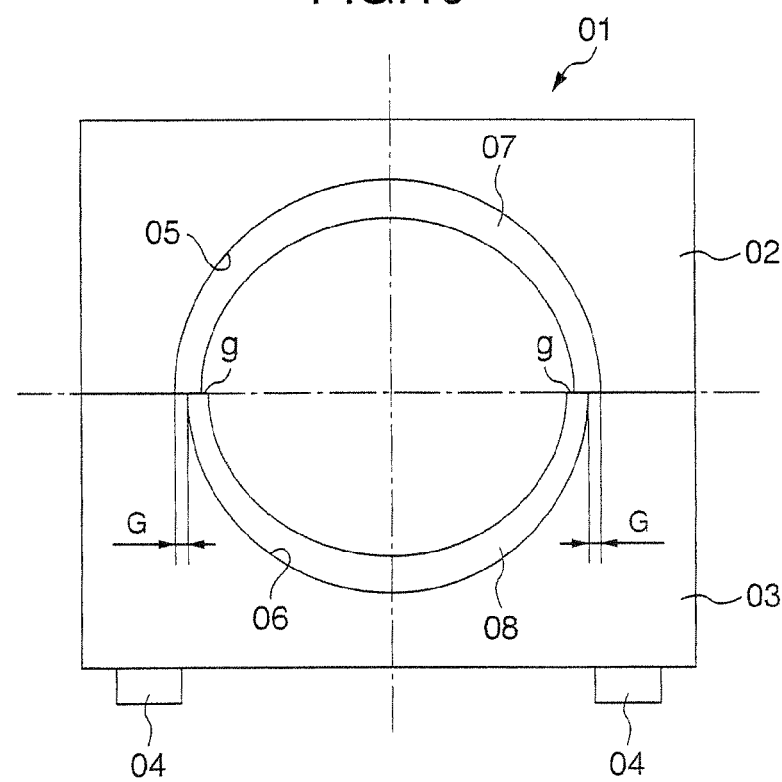
FIG. 10 is an explanatory view illustrating a conventional example in which a split-type bearing comprised of a pair of semi-cylindrical bearing bodies is assembled in the split-type bearing housing shown in FIG. 9.

Thus, when the housing halves 14, 16 are integrally combined with each other by fastening bolts 18, the degree of expansive deformation of the housing half 14 having a low stiffness at the abutting end parts is greater than that of the housing half 16 having a high stiffness, as stated hereinbefore and as shown in FIG. 10, and accordingly, the inner diameter of the bearing retailing bore is different between both housing halves 14, 16. Thus, there would be possibly caused a differential step (g) as shown in FIG. 10 between the abutting end faces 20b, 22b of the semi-cylindrical bearing bodies 20, 22. However, in this embodiment, the inner surfaces of the semi-cylindrical bearings 20, 22 are designed so as to be aligned with each other at their abutting end faces 20b, 22b, that is, the abutting end faces 20b, 22b are set in the condition as shown in FIG. 1, since the semi-cylindrical bearing bodies 20, 22 have an equal outer diameter in their initial condition, and since the wall thickness of the abutting end part 20a is greater than that of the abutting end part 22a. Thus, the oil wiping phenomenon can hardly occur at the abutting end faces 20b, 22b of both semi-cylindrical bodies 20, 22.

In fact, in order to align the inner surfaces of both semi-cylindrical bearing bodies 20, 22 with each other as stated above, the split-type bearing housing 10 itself (that is, a cylinder block and a bearing cap) or a model which has been prepared being formed to mimic a part of the split-type bearing housing itself are used.

A degree of difference between the inner diameters of the pair of semi-cylindrical bearing bodies having one and the same shape and dimensions, is measured at the abutting surfaces of them with the use of a measuring device such as a roundness measuring unit, in the condition that both semi-cylindrical bearing bodies are combined with each other by fastening bolts after the pair of semi-cylindrical bearing bodies are incorporated in the bearing retaining bore in the split-type bearing housing.

With the use of thus measured values, the wall thickness of both circumferential end parts of the semi-cylindrical bearing to be incorporated in the housing half having a relatively lower stiffness are set to be larger than that of the semi-cylindrical bearing body which is incorporated in the housing half having a relatively higher stiffness by the value of difference which has been actually measured with the use of the split-type bearing housing or the above-mentioned model.

Alternatively, or conveniently, the wall thickness of the circumferential end part of the semi-cylindrical bearing body which is incorporated in the housing half having a relatively lower stiffness can be set to be larger than that of the semi-cylindrical bearing body incorporated in the housing half having a relatively higher stiffness by a half of the degree of expansive deformation difference of the bearing retaining bore for the split-type sliding bearing, which can be calculated from the equations (1) to (6) as stated hereinabove.

Although it has been stated hereinabove that the inner surfaces of both semi-cylindrical bearing bodies are aligned with each other at their abutting end faces 20b. 22b, the alignment should not be always limited to the condition that they are completely aligned with each other in view of its geometrical sense. It is because that manufacturing errors are inevitably caused during manufacturing of both semi-cylindrical bearing bodies, and during machining of the bearing retailing bore in the split-type bearing housing, and further, a slight positional deviation is caused between the above-mentioned abutting end faces 20b, 22b when the split-type bearing housing is reassembled by fastening bolts after the both semi-cylindrical bearing bodies are incorporated in the split-type bearing housing. Thus, a differential step of not greater than 5 μm (that is, ±5 μm) should be allowed in the radial direction on one of the abutting end sides of both semi-cylindrical bodies.

Although explanation has been made of the split-type sliding bearing for an internal combustion engine, having the most generic type that the semi-cylindrical bearing bodies have a wall thickness which is largest in the circumferential midsections (20x, 22x) of both semi-cylindrical bearing bodies, and which is smaller and smaller toward both circumferential end faces thereof. However, the present invention should not be limited to the split-type sliding bearing of this type. According to the present invention, there may be used the type that has the wall thickness which is uniform over the entire circumferential length of each of both semi-cylindrical bearing bodies, the type that a wall thickness which is smallest in the circumferential midsection and which is larger and larger toward the circumferential end faces thereof, or the type that has the inner surface which consists of circular arc surfaces having different curvatures, as far as the inner surfaces of the pair of semi-cylindrical bearing bodies are aligned with each other at their abutting end faces when both semi-cylindrical bearing bodies are incorporated in the split-type bearing housing. Further, there may be used the combination of a pair of semi-cylindrical bearing bodies of types which are different from each other.

Figure 2:
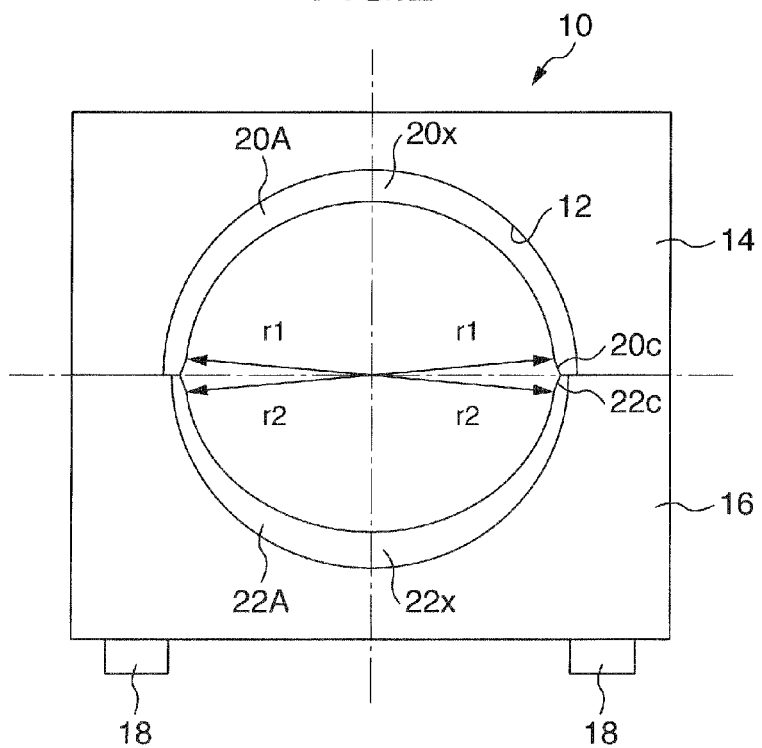
FIG. 2 is a view similar to FIG. 1, illustrating the split-type sliding bearing shown in FIG. 1 in a condition the split-type sliding bearing is formed with crush relieves.

Further, similar to conventional semi-cylindrical bearing bodies, the semi-cylindrical bearing bodies 20A, 22A are formed with crush relieves (20c, 22c: inner diameter enlarging parts) in the circumferentially opposite end parts on the inner surface side thereof (refer to FIG. 2). In the case where the crush relieves are provided, the radii (r1, r2: refer to FIG. 2) of the semi-cylindrical bearing bodies mounted respectively on the housing half having a low stiffness and the other housing half having a high stiffness, which radii are measured from the circumferential center of the bearing at positions adjacent to the regions of the crush relieves on the inner surfaces of the semi-cylindrical bearing bodies, should be identical to each other (that is, r1=r2).

Embodiment 2

Figure 3:
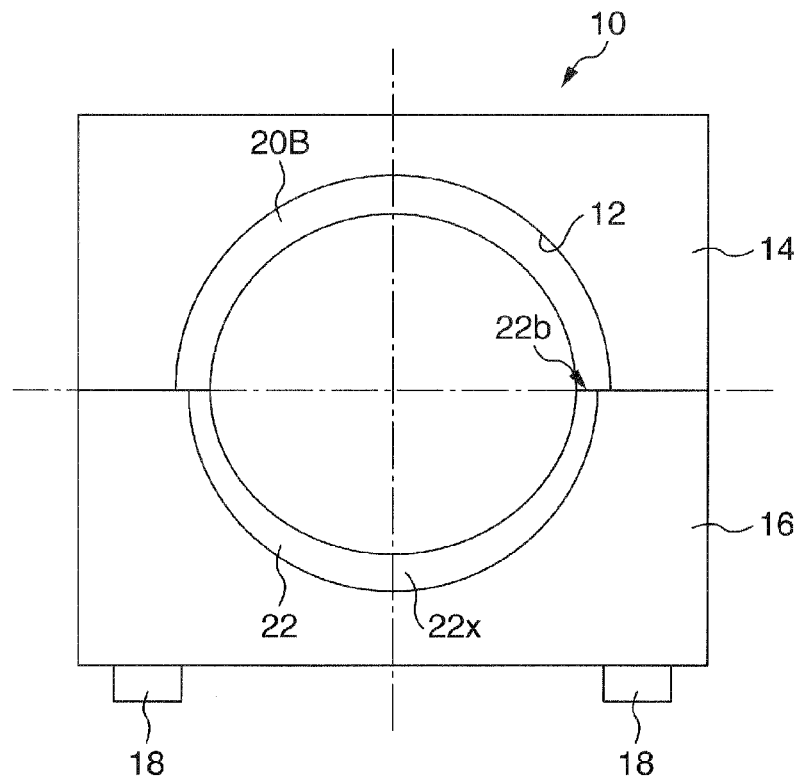
FIG. 3 is a front view illustrating a split-type sliding bearing for a crankshaft in an internal combustion engine, in Embodiment 2 of the present invention, in a condition in which the split-type sliding bearing is incorporated in a split-type bearing housing comprised of bearing halves having degrees of stiffness which are different from each other.

Explanation will be made of an embodiment 2 of the present invention in which the same split-type bearing housing 10 as explained in the embodiment 1 is used, with reference to FIG. 3 which show the condition that the inner surfaces of semi-cylindrical bearing bodies 20B and 22 are aligned with each other at their opposite circumferential end faces when the housing halves 14 and 16 are combined with each other by fastening bolts after the semi-cylindrical bearing bodies 20B and 22 are incorporated in the mated housing halves 14 and 16 such that the cylindrical bearing body 20B having a wall thickness which is circumferentially uniform is mounted on the housing half 14 having a relatively lower stiffness and being made of aluminum alloy, and the other cylindrical bearing body 22, having a thickness which is largest in the circumferential midsection and decreases toward the abutting circumferential end faces 22b thereof, is mounted on the other housing half 16 having a relatively higher stiffness, wherein the semi-cylindrical bearing body 22 is identical to the semi-cylindrical bearing body 22 shown in FIG. 1). With this configuration, the clearance between the inner surface of the semi-cylindrical bearing body 20B which is mounted on the housing half 14 having a relatively lower stiffness and exhibiting a large degree of expansive deformation, and the outer peripheral surface of a shaft to be supported (which is not shown) can be decreased over the entire inner surface of the semi-cylindrical bearing body 20B, and accordingly, it is effective for preventing occurrence of leakage of lubricant oil. It is noted in this case that although no specific limitations are present as to the configuration of the semi-cylindrical bearing body 22 mounted on the housing half 16 having a relatively higher stiffness as far as the inner surfaces are aligned with each other at the circumferential end faces, there may be preferably used a semi-cylindrical bearing body 22 having a thickness which is largest in the circumferential midsection and decreases toward the abutting circumferential ends faces in order to set the bearing clearance to be smallest in the circumferentially midsection, which affects the silence during operation of the internal combustion engine.

Embodiment 3

Explanation will be hereinbelow made of an embodiment 3 in the present invention with reference to FIG. 4. A pair of housing halves 14, 16 of a bearing housing 10 are combined with each other by fastening bolts 18, and accordingly, the inner diameter of the housing half 14 is enlarged due to stress occurred when fastening the bolts, at the abutting end faces of the housing half 14 having a relatively lower stiffness, and as a result, the housing half 14 is elastically deformed so that the bore of the split-type bearing housing possibly becomes elliptic, that is, the inner diameter of the bore is smaller in the direction perpendicular to a phantom plane including opposite abutting end faces thereof. In this case, if a usual semi-cylindrical bearing body having a uniform wall thickness were used, the bearing clearance between the inner surface of the semi-cylindrical bearing body mounted on the housing half 14 having a relatively lower stiffness and a crankshaft which is the shaft to be supported would be gradually enlarged toward the circumferential end faces of the semi-cylindrical bearing body. As a result, the leakage amount of lubricant oil from the enlarged part of the bearing clearance would be increased. As a countermeasure to the above-mentioned problem, in this embodiment, the wall thickness of the semi-cylindrical bearing body 20C mounted on the housing half 14 having a relatively lower stiffness is gradually increased from the circumferential midsection thereof toward the circumferential end faces. Thus, the bearing clearance can be restrained from being increased so as to be maintained at a small value.

The wall thickness of the semi-cylindrical bearing body 22B mounted on the housing half 16 having a relatively higher stiffness is uniform over the entire circumferential length thereof, but is smaller than that of the circumferential end parts of the semi-cylindrical bearing body 20C.

Figure 4:
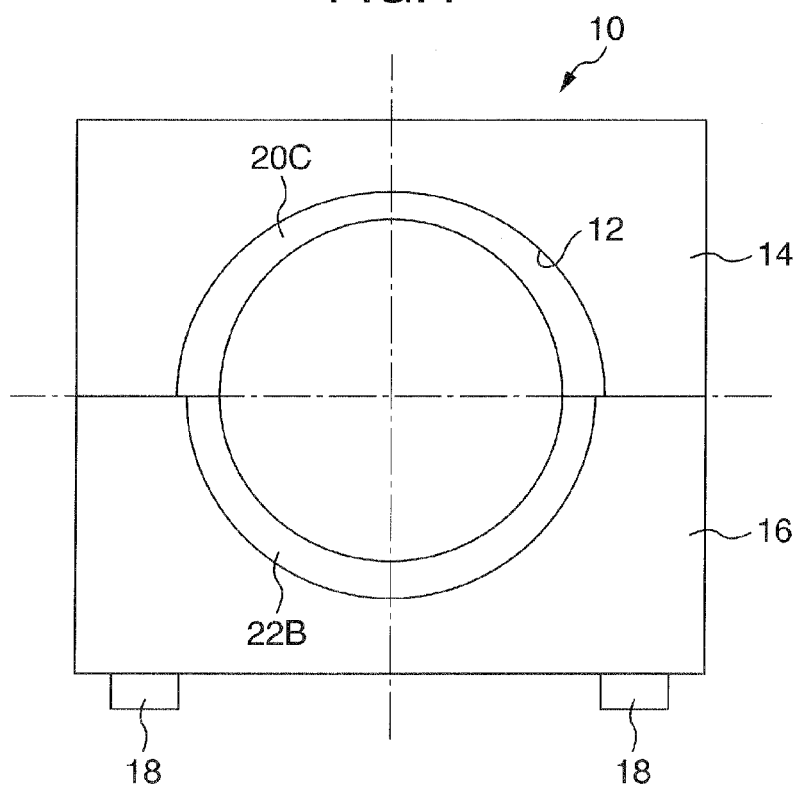
FIG. 4 is a front view illustrating a split-type sliding bearing for a crankshaft in an internal combustion engine, in Embodiment 3 of the present invention, in a condition in which the split-type sliding bearing is incorporated in a split-type bearing housing comprised of bearing halves having degrees of stiffness which are different from each other.

Although no specific limitation to the configuration of the type of the semi-cylindrical bearing body mounted on the housing half 16 having a relatively higher stiffness is present as far as the inner surface thereof can be aligned with that of the semi-cylindrical bearing body 20C at their abutting end faces, there may be preferably used a semi-cylindrical bearing body 22B having a wall thickness which is uniform over the entire circumferential length of the semi-cylindrical bearing body in order to set the bearing clearance to a value which is small as possible over the entire circumferential length of the semi-cylindrical bearing body so as to enhance the silence during operation of the internal combustion engine (refer to FIG. 4).

Embodiment 4

Explanation will be made of an embodiment 4 with reference to FIG. 5. In this embodiment, the wall thickness of a semi-cylindrical bearing body 20D mounted on a housing half 14 having a relatively lower stiffness and made of aluminum alloy is set at its opposite end parts to be larger than that of a semi-cylindrical bearing body 22C mounted on a housing half 16 having a relatively higher stiffness and made of iron alloy, and the inner surfaces of the pair of semi-cylindrical bearing bodies 20D, 22C are aligned with each other at their abutting faces. However, a differential step (g) of about 5 μm at maximum, is possibly caused between the abutting end faces of the pair of semi-cylindrical bearing bodies 20D, 22C on one of opposite sides thereof since manufacturing errors are inevitably caused during manufacturing of the semi-cylindrical bearing halves 20D, 22C and during machining the bearing retaining bore 12 in the split-type bearing housing 10 comprised of the housing halves 14, 16, and since a slight deviation is caused between the abutting end faces of the housing halves 14, 16 (the split surfaces of the split-type bearing housing) when the housing halves 14, 16 are combined with each other by fastening bolts 18 after the semi-cylindrical bodies 20D, 22C are incorporated in the split-type bearing housing.

Figure 5:
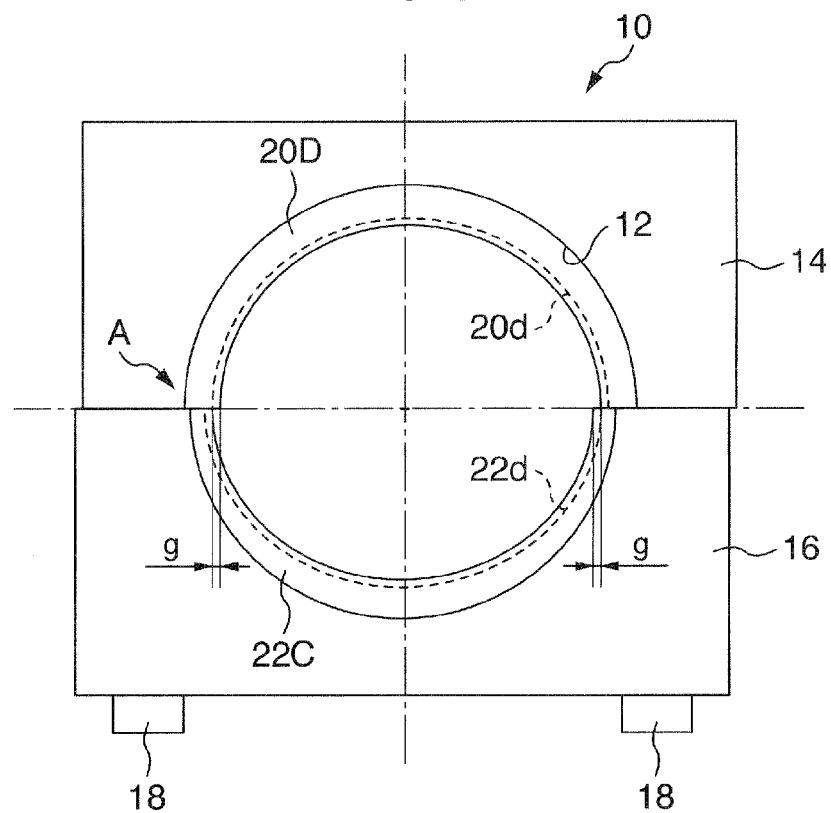
FIG. 5 is a front view illustrating a split-type sliding bearing for a crankshaft in an internal combustion engine, in Embodiment 4 of the present invention, in a condition in which the split-type sliding bearing is incorporated in a split-type bearing housing comprised of bearing halves having degrees of stiffness which are different from each other.
Figure 7:
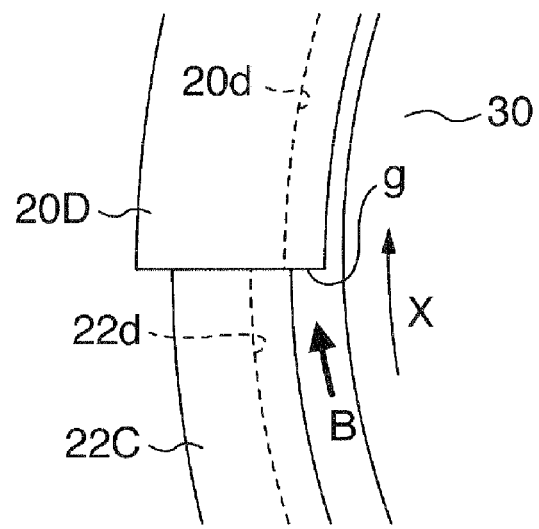
FIG. 7 is an enlarged view illustrating a portion in which a differential steps shown in FIG. 5 is formed.

FIG. 5 shows the condition that a positional deviation is caused between the abutting end faces of the housing halves 14, 16 (the split surfaces of the split-type bearing housing) when the housing halves 14, 16 are combined with each other by fastening the bolts 18, and accordingly, the differential step (g) is caused between the inner surfaces of the semi-cylindrical bearing bodies 20D, 22C at the abutting end faces of them. FIG. 7 is an enlarged view which shows the part A where the differential step is caused between the semi-cylindrical bearing bodies 20D, 22C shown in FIG. 5. Referring to FIG. 7, a crank shaft 30 is shown.

Figure 8:
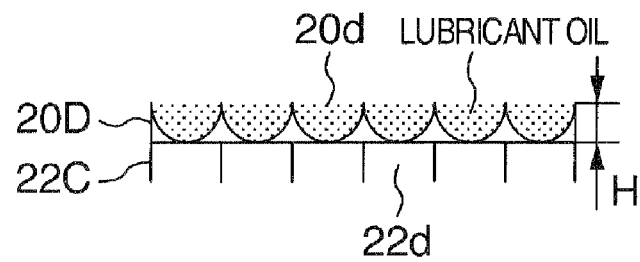
FIG. 8 is a cross-sectional view illustrating circumferential grooves formed in the inner surface of a semi-cylindrical bearing body which constitutes the split-type sliding bearing in Embodiment 4 of the present invention, as viewed at a circumferential end face of the semi-cylindrical bearing body.
Figure 9:
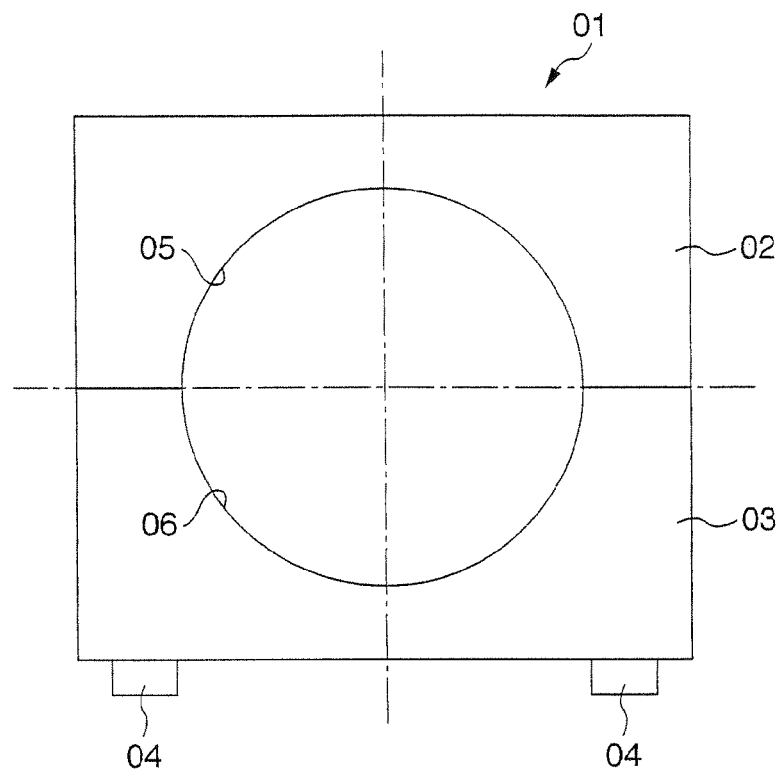
FIG. 9 is an explanatory view illustrating a conventional example in which a split-type bearing housing comprised of a pair of housing halves having degrees of stiffness which are different from each other are assembled.

The configuration of the semi-cylindrical bearing bodies 20D, 22C is identical to that of the semi-cylindrical bodies 20B, 22 in the embodiment 3 (refer to FIG. 3), except that several circumferential grooves 20d, 22d are formed in the inner surfaces thereof. The circumferential grooves 20d, 22d preferably have a circular arc cross-sectional shape as shown in FIG. 8 in which reference mark H denotes the depth of the circumferential grooves 20d, 22d. As the differential step (g) which is a part of the abutting end face of the semi-cylindrical bearing body 20C being viewed in a direction indicated by the arrow B shown in FIG. 7, the cross-sectional shape of the circumferential grooves 20d are appeared being opened at abutting end faces as shown in FIG. 8.

Even though the differential step (g) of 5 μm at maximum arises between the inner surfaces of the semi-cylindrical bearing bodies 20D, 22C at the abutting end faces thereof, due to the provision of the circumferential grooves 20d, 22d formed on the inner surfaces of the semi-cylindrical bearing bodies 20D, 22C and having a depth of not less than 5 μm but not greater than 20 μm which are approximately equal to the size of the differential step (g), the lubricant oil flowing in the rotating direction (the arrow X in FIG. 7) of the crankshaft 30 is never hindered by the differential step (g) caused between the abutting end faces of the semi-cylindrical bearing body 20D, and accordingly, can smoothly flow into and through the circumferential grooves 20d. Thereby it is possible to prevent, in success, occurrence of the oil wiping phenomenon, which is caused by the differential step (g).

Contrasting, in the case of no circumferential grooves formed in the inner surface of the semi-cylindrical bearing body, a differential step caused between the abutting end faces of the semi-cylindrical bodies becomes a barrier which blocks the path of the lubricant oil flowing in the rotating direction of the crankshaft, and the differential step causes the oil wiping phenomenon. As a result, the lubricant oil which has come to the position of the differential step can readily flow widthwise of the bearing along the differential step, and according, it cannot ensure sufficient lubrication for the bearing.

Explanation has been hereinabove made of the circumferential grooves 20d, 22d having a depth (H) which is limited to a value that is not greater than 20 μm. The reason why the above-mentioned limitation is set, is such that if the depth is greater than 20 μm, the film of the lubricant oil can hardly be formed on the sliding surface of the circumferential midsection of the semi-cylindrical bearing body upon which a dynamic load is mainly exerted during the operation of an internal combustion engine. It is noted that the depth of the circumferential grooves is more preferably set to a value which is not less than 10 μm but not greater than 15 μm.

Further, the circumferential grooves formed in the inner surface of the semi-cylindrical bearing body have widthwise pitches which are not less than 0.3 mm but not greater than 1.5 mm. It is because should it be less than 0.3 mm, the respective surfaces of the crests of ridges which define therebetween the circumferential grooves would be excessively small and accordingly, the crests would soon be worn being made into contact with the crankshaft, larger the degree of abrasion, the larger the bearing clearance, resulting in an increase in the quantity of leakage of the lubricant oil, but should it be greater than 1.5 mm, the number of ridges widthwise of the inner peripheral wall of the semi-cylindrical bearing which bears a load from the crankshaft would be less, and the surface pressure applied to the crest of each of ridges would become higher so as to cause frictional heat which lowers the strength of the material of the semi-cylindrical bearing body, resulting in an increase in degree of abrasion. Thus, in order to reduce the abrasion of the semi-cylindrical bearing body, it is more preferable to set the pitches of the circumferential grooves to a value within the range of 0.5 to 1.2 mm.

Although the circumferential grooves 20d, 22d in the semi-cylindrical bearing bodies 20D, 22C are formed in the inner surface thereof over its entirety in this embodiment, they may be formed only in the range of a circumferential length corresponding to a predetermined circumferential angle measured from the circumferential end faces of the semi-cylindrical bearing bodies 20D, 22C as a starting point on the side where the differential step (g) facing a direction opposite to the rotation direction of the crankshaft is present.

It is noted that the circumferential grooves 20d, 22d preferably have a shape which is not only a circularly arc cross-sectional shape, as shown in FIG. 8, but also a V-like cross-sectional shape.

In the case of the circumferential grooves having the circular arc cross-sectional shape, the differential step which is a part of the abutting end face of the semi-cylindrical bearing body is occupied by not less than ⅔ of its entire area by the spaces in the grooves through which the lubricant oil flows. Accordingly, it is represented that there may be exhibited the technical effects equivalent to that obtained by reducing the degree of the differential step (g; refer to FIG. 7) to a value which is substantially not more than ⅓.

In the case of the circumferential grooves having a V-like cross-sectional shape, the differential step which is a part of the abutting end face of the semi-cylindrical bearing body is occupied by not less than ½ of its entire surface area by the spaces of the circumferential grooves through which the lubricant oil flows. Accordingly, it is shown that there can be exhibited the technical effects equivalent to that obtained by reducing the degree of the differential step (g; refer to FIG. 7) to a value which is substantially not more than ½. In order to form the circumferential grooves, by using a cutter blade having a circular arc edge or a V-like edge, the shape of the edge thereof is transferred into the inner surface of bearing semi-cylindrical bearing body by lathing.

Embodiment 5

Figure 6:
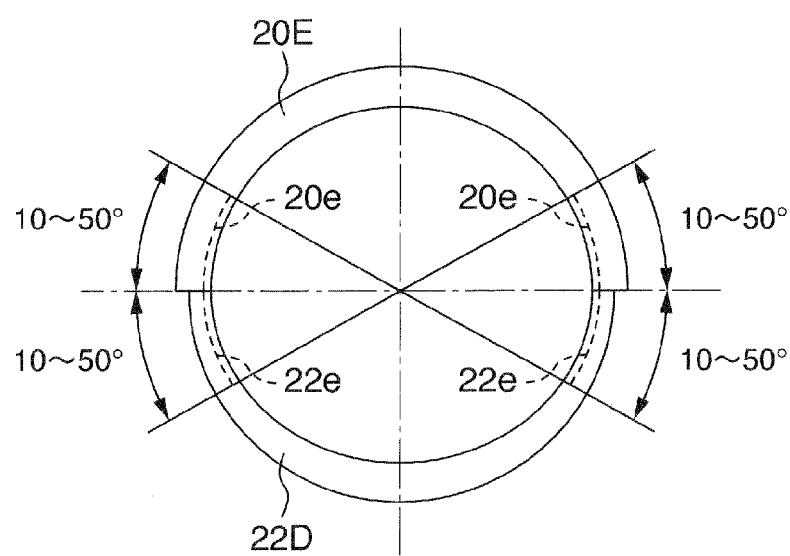
FIG. 6 is a front view illustrating a split-type sliding bearing for a crankshaft in an internal combustion engine in Embodiment 5 of the present invention, in a condition in which the split-type sliding bearing is incorporated in a split-type bearing housing comprised of bearing halves having degrees of stiffness which are different from each other.

Explanation will be hereinbelow made of another configuration of the circumferential grooves as show in FIG. 6. The circumferential grooves in semi-cylindrical bearing bodies 20E, 22D have a configuration, substantially the same as that of the semi-cylindrical bearing bodies 20D, 22C shown in FIG. 5, except that the ranges with which the circumferential grooves 20e, 22e are formed are different from that shown in FIG. 5. That is, the circumferential grooves 20e, 22e are formed in a range of a circumferential length corresponding to a circumferential angle of at least 10 deg. but 50 deg. at maximum, measured from the respective circumferential end faces of the semi-cylindrical bearing bodies 20E, 22D as a stating point. With this configuration, it is possible to prevent occurrence of the oil wiping phenomenon similar to the configuration of the embodiment 4, even though a differential step is caused between the circumferential end faces of the semi-cylindrical bearing bodies.

Further, the inner surfaces have a degree of surface roughness which is set to 3.2 μmRz that is equal to the degree of surface roughness of a usual sliding bearing, in a range in which no circumferential grooves are formed. With the degree of surface roughness, an oil film can be readily formed on the sliding surface of the circumferential midsection which serves as the main load bearing portion of the semi-cylindrical bearing body, and accordingly, a sliding bearing having a sufficient load capacity can be ensured.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A split-type sliding bearing adapted for mounting on a crankshaft for an internal combustion engine, comprising:
   a pair of semi-cylindrical bearing bodies which are combined with each other to form a cylindrical body, and which are incorporated in a split-type bearing housing, having a cylindrical bearing retaining bore and comprising a pair of housing halves each corresponding to the respective semi-cylindrical bearing body when the semi-cylindrical bearing bodies are incorporated in the cylindrical bearing retaining bore,
   wherein the split-type bearing housing comprises one housing half having a lower stiffness, and another housing half having a higher stiffness,
   wherein the housing half of lower stiffness supports one of the pair of semi-cylindrical bearing bodies, which is a first semi-cylindrical bearing body, and the housing half of higher stiffness supports the remainder of the pair of semi-cylindrical bearing bodies, which is a second semi-cylindrical bearing body, and
   wherein the first semi-cylindrical bearing body and the second semi-cylindrical bearing body have the following dimensional relationship before they are incorporated in the bearing housing consisting of the pair of the housing halves:
      (1) the first semi-cylindrical bearing body and the second semi-cylindrical bearing body have an equal outer diameter, and
      (2) circumferential end parts of the first semi-cylindrical bearing body have a larger thickness than circumferential end parts of the second semi-cylindrical bearing body,
   whereby, in an incorporated condition, the circumferential end parts of the first semi-cylindrical bearing body and the circumferential end parts of the second semi-cylindrical bearing body abut, an inner surface of the first semi-cylindrical bearing body and an inner surface of the second cylindrical bearing body are in alignment with each other at said abutting circumferential end parts and deformation between the pair of housing halves results in a stepped difference at an outer surface of the first semi-cylindrical bearing body and an outer surface of the second semi-cylindrical bearing body at said abutting circumferential end parts due to differences between the lower stiffness and the higher stiffness.

2. The split-type sliding bearing according to claim 1, wherein the first semi-cylindrical bearing body has a uniform thickness throughout the entire circumferential length thereof.

3. The split-type sliding bearing according to claim 1, wherein the first semi-cylindrical bearing body has a thickness increasing from a circumferential midsection toward the abutting circumferential end faces of the first cylindrical bearing body.

4. The split-type sliding bearing according to claim 1, wherein the second semi-cylindrical bearing body has a uniform thickness throughout the entire circumferential length thereof.

5. The split-type sliding bearing according to claim 1, wherein the second cylindrical bearing body has a thickness decreasing from a circumferential midsection toward the circumferential end parts of the second cylindrical bearing body.

6. The split-type sliding bearing according to claim 1, wherein at least the second semi-cylindrical bearing body is provided with a number of circumferential grooves formed on the inner surface of the second semi-cylindrical bearing body, and the circumferential grooves have a depth of from not less than 5 μm to not more than 20 μm in circumferential end regions including circumferential ends thereof.

7. The split-type sliding bearing according to claim 6, wherein the circumferential end regions in the inner surface of the second semi-cylindrical bearing body has a range defined by a circumferential length corresponding to a circumferential angle of at least 10° but up to 50°, which is measured from the respective circumferential end of the second semi-cylindrical bearing body as a starting point.

8. The split-type sliding bearing according to claim 7, wherein the inner surface of the second semi-cylindrical bearing body has a surface roughness of not more than 3.2 μm Rz except for the circumferential end regions.

9. A split-type sliding bearing according to claim 6, wherein the circumferential grooves in the second semi-cylindrical bearing body have a pitch of 0.3 mm to 1.5 mm.

10. A split-type sliding bearing according to claim 6, wherein the first semi-cylindrical bearing body is provided with a number of circumferential grooves formed on the inner surface of the first semi-cylindrical bearing body, and the circumferential grooves have a depth of from not less than 5 μm to not more than 20 μm in circumferential end regions including both circumferential ends.

11. The split-type sliding bearing according to claim 10, wherein each of the circumferential end regions in the inner surface of the first semi-cylindrical bearing body has a range defined by a circumferential length corresponding to a circumferential angle of at least 10° but up to 50°, which is measured from the respective circumferential end of the first semi-cylindrical bearing body as a starting point.

12. The split-type sliding bearing according to claim 11, wherein the inner surface of the first semi-cylindrical bearing body has a surface roughness of not more than 3.2 μm Rz except for the circumferential end regions.

13. The split-type sliding bearing according to claim 10, wherein the circumferential grooves in the first semi-cylindrical bearing body have a pitch of 0.3 mm to 1.5 mm.

* * * * *